United States Patent [19]

Murray

[11] Patent Number: 5,113,630
[45] Date of Patent: May 19, 1992

[54] ADJUSTABLE STONE FORMED WORK SUPPORT AND METHOD OF PROVIDING SAME

[75] Inventor: Donald C. Murray, Graniteville, Vt.

[73] Assignee: Rock of Ages Corporation, Barre, Vt.

[21] Appl. No.: 577,574

[22] Filed: Sep. 5, 1990

[51] Int. Cl.⁵ .............................................. E04C 3/10
[52] U.S. Cl. .................................. 52/223 R; 52/225; 52/227; 52/230; 52/741
[58] Field of Search .................. 52/223 R, 223 L, 225, 52/227, 230, 231, 741, 745

[56] References Cited

U.S. PATENT DOCUMENTS

| | | |
|---|---|---|
| 314,019 | 3/1885 | Harroun . |
| 627,424 | 6/1899 | Jarrett . |
| 744,056 | 11/1903 | Emerson . |
| 813,872 | 2/1906 | Downs . |
| 1,951,132 | 11/1932 | Cox . |
| 2,234,663 | 3/1941 | Anderegg ............... 52/223 R |
| 2,414,011 | 1/1947 | Billner ............... 52/223 R X |
| 2,786,349 | 3/1957 | Coff ............... 52/223 R |
| 2,921,463 | 1/1960 | Goldfein ............... 52/223 R |
| 2,963,273 | 12/1960 | Lane ............... 52/223 R |
| 3,036,356 | 5/1962 | Greulich ............... 52/223 R X |
| 3,457,890 | 7/1969 | Rivas et al. ............... 52/223 R |

OTHER PUBLICATIONS

*Dywidag Systems International,* entitled "General" and Analysis, pp. 190-193.

Primary Examiner—Richard E. Chilcot, Jr.
Attorney, Agent, or Firm—Mason, Fenwick & Lawrence

[57] ABSTRACT

The stone slab work support has its strength and resonant frequency increased by boring a long, small diameter hole along one or more longitudinal or transverse axes, inserting a tendon of high-strength steel in the hole such that threaded ends of the tendon protrude from the hole, and placing stress on the tendon through elongation and tightening threaded nuts engaging pressure washers to tension the tendon. The stone plate is thus compressed by the tension exerted by the fastener-tendon assembly and its resonant frequency increased above the frequency generated by equipment supported on the stone. Compressive stress is exerted on the stone plate, closing micro-cracks to increase the modulus of elasticity and increase the resonant frequency of the stone. The tendon may be inserted along an axis offset from the stone slab center of gravity by any desired eccentric value, enabling stress and deflection control of the slab for a wide variety of load cases.

21 Claims, 1 Drawing Sheet

ADJUSTABLE STONE FORMED WORK SUPPORT AND METHOD OF PROVIDING SAME

BACKGROUND OF THE INVENTION

1. Field of the Invention

The present invention generally relates to the field of stone surface plates and machine bases and to methods and apparatus for reinforcing natural stone for providing dimensionally stable and less vibration prone stone surface plates and machine bases. More specifically, natural stone is reinforced by boring long, small diameter holes in a stone plate and inserting a tendon in each hole which is then placed in tension by jacking and retained by plural end fasteners engageable with opposite surfaces of the stone so as to place desired portions of the stone in compression. The term "surface plate" as used herein refers to a stone slab or plate having at least one precisely ground work surface (usually an upper surface) which is normally used as a support for other equipment such as sensitive measuring devices, optical comparaters and lens grinders. The term "machine base" as used herein refers to large stone supports for machines which usually include one or more ground surfaces. The generic term "stone formed work support" is used herein to refer to surface plates, machine bases and the like.

2. Related Art

Certain precision machine tools and other apparatus require a strong, stable, vibration-free and dimensionally stable mounting support for optimum operation. In the past, natural stone plates have provided the most stable support for such devices.

Unfortunately, natural stone is somewhat limited in use due to its inherent mechanical properties. For example, typical stone such as Barre granite native to Vermont has a low modulus of elasticity and low modulus of rupture. Consequently such granite is brittle and will easily fracture. The low modulus of rupture necessitates that stone plates used as machine bases be thick and span only short distances.

Stone bases as presently used have a low first bending mode frequency and are therefore susceptible to low frequency resonant vibrations caused by the fact that many of the machines and devices which they support generate such low frequencies. The present invention increases the first bending mode frequency so as to minimize resonant frequencies generated in the stone.

It is also known that micro-cracks can cause stress to focus in a small region of the stone, resulting in increased possibility of additional extensive cracking and possible fracture and even failure cracking under load-induced stress. Such failure in stone used to support sensitive equipment can at worst damage or destroy the equipment or impair or prevent its operation.

Another problem with prior known stone formed work supports is that they deflect when placed under heavy load and are consequently not usable for supporting a wide variety of items of different weights due to different amounts of deflection under different loads.

Therefore, there has been a long-existing need to provide stone surface plates having greater strength and rigidity.

Another problem encountered in providing stone bases or supports for machinery or equipment arises from the fact that the support portions of the machinery engaging the stone may be widely spaced and/or at different elevations so that fabrication from a single unitary stone workpiece to accommodate the geometry of the item to be supported is difficult, expensive and sometimes impossible.

It has been conventional practice in the past to embed metal reinforcement rods and the like in cement or concrete prior to setting as shown in U.S. Pat. Nos. 313,019; 627,424; 744,056; 813,872; and 1,951,132. It has also been known to use reinforcement rods embedded in concrete to connect plural blocks together as shown in U.S. Pat. No. 627,424. However, the use of such connections has not employed high tension rods which operate to compress the connected members to increase their strength.

It has also been conventional practice to use threaded rods such as those manufactured by Dywidag Systems of New Jersey, U.S.A., which are tensioned by jacking and retained by rotary nuts threaded onto the rods in concrete construction. Post-tensioned concrete beams and columns have also been employed in building construction in conjunction with concrete beams, columns, and slabs that have been pre-tensioned. Prestressed anchors have also been used in stabilization of dams, retaining walls, underground excavations and the like. However, none of the above-noted prior art practices teaches or suggests the present invention's use of stone compression for solving the aforementioned problems of the stone formed work support specifically with regard to the modulus of elasticity increase.

SUMMARY OF THE INVENTION

The aforementioned disadvantages of known stone formed work supports are overcome by the present invention by providing compression internally of stone work supports induced by post-tensioning. As a result, deflection of the stone formed work supports is reduced and the first bending mode frequency is increased due to the increased modulus of elasticity of the post-tensioned stone. The stone becomes stiffer, can be supported on more widely spaced supports so as to enable longer spans, and has less downward deflection (sag). Further, the foregoing properties of the stone may be adjusted according to specific applications.

The invention is directed to the use of apparatus for stressing a stone formed work support to increase its strength and stability. The apparatus includes at least one steel tendon of low-relaxation material having threaded ends adapted to receive respective force exerting pressure washer elements, and further adapted to fit within a bored hole extending through the length of the stone formed work support so that threaded pressure retaining nuts on the respective threaded ends of the tendon can be tightened to compress the stone between the pressure washers. The force with such a desired pressure so as to selectively compress a portion of the stone slab to a degree that micro-cracks in the compressed stone portion are substantially closed and/or deflection of the stone is reduced.

A stable support assembly providing support for a variety of delicate machine tools and the like which require a high degree of stability is provided. The assembly permits adjustment of the amount of compression of the stone formed work support to permit it to support heavier or lighter loads while maintaining required planar support surfaces and overall shape. The foregoing results are achieved by proper selection of the amount the tendon is offset below the medial axis of the stone and the tendon tension so that sagging of the stone can be offset to a desired selected degree.

The invention also includes the described method for reinforcing natural stone and the adjustments permitted thereby for achieving desired stone configurations under different load conditions.

Accordingly, one object of the present invention is to improve the ability of natural stone formed work supports including stone surface plates and machine bases and similar structures to carry loads by inducing compression within the stone.

A further object of this invention to provide a new and improved stone workpiece which is assembled of multiple stone components held together in a rigid manner to provide a desired size and shape while using a minimum amount of stone.

Another object of the invention is to provide apparatus and method for permitting surface plate adjustment to provide a more perfectly planar work surface in the stone.

Another object of the present invention is to improve resistance to low frequency vibration of stone plates by increasing the first bending mode frequency of the stone plates.

Still another object of the invention is to enable greater allowable spans between load-bearing supports for stone plates.

BRIEF DESCRIPTION OF THE DRAWINGS

The invention is better understood by reading the following detailed description of the preferred embodiments with reference to the accompanying drawing figures, in which like reference numerals refer to like elements throughout, and in which.

DETAILED DESCRIPTION OF THE PREFERRED EMBODIMENTS

Figure 1:
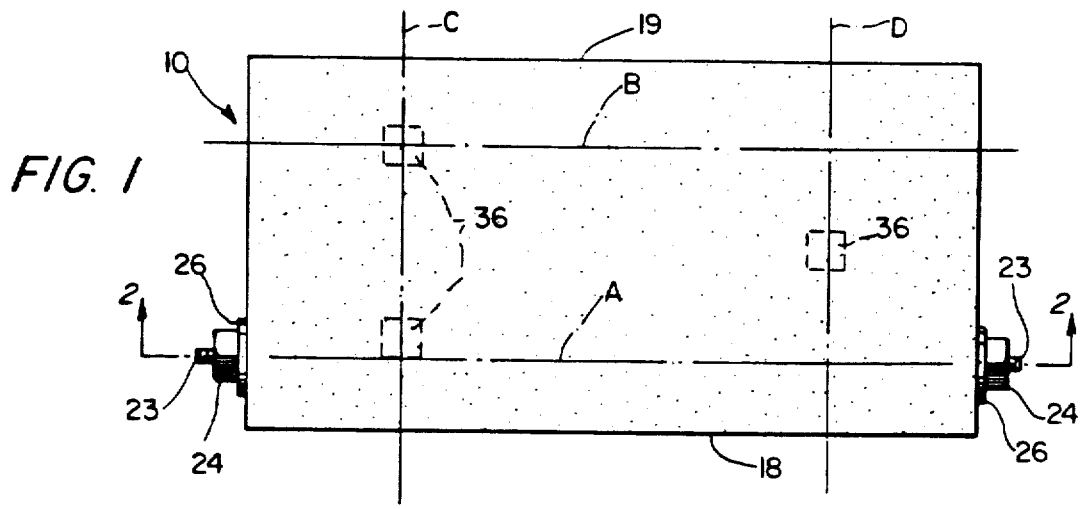
FIG. 1 is a plan view of a first embodiment of the invention illustrating a natural stone surface plate placed in compression in accordance with the present invention.

In describing the disclosed embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 2:
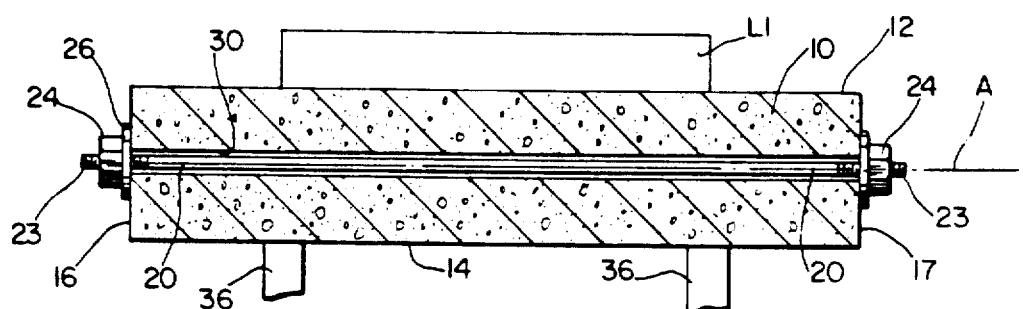
FIG. 2 is a section taken along line 2—2 of FIG. 1, showing interior details of the first embodiment.

FIGS. 1 and 2 illustrate a first embodiment of the invention which includes a natural granite stone surface plate 10 of rectangular configuration and which includes an upper surface 12 on which a load L1 in the form of conventional apparatus is supported, a lower surface 14, end surfaces 16 and 17, a front surface 18 and a rear surface 19. A longitudinally extending horizontal bore 30 having an axis A extends the length of stone surface plate 10 and has end openings in end surfaces 16 and 17. A steel tendon 20 is positioned to extend along the length of bore 30 and has threaded ends 23 extending outwardly beyond end surfaces 16 and 17 of the surface plate 10. The tendon is placed in tension by conventional jack means following positioning of the tendon in bore 30. Pressure washers 26 are positioned over each threaded end 23 to engage end surfaces 16 and 17 against which they are clamped by threaded nut members 24 following disconnection of the jack means used to tension the tendon. The tension in the tendon consequently causes compression of the stone between the washers. The stone surface plate is supported by three legs 36 as shown in FIG. 1; additional legs 36 could be employed, if needed.

Tendon 20 is advantageously fabricated of a strong substance such as a variety of steel compositions having low relaxation character. The nut members can each be rotated on the tendon so as to cause the pressure washers 26 to approach and contact the stone. One of the nut members is tightened so that the tendon 20 is held in an elongated state produced by jacking. This places the tendon in tension and substantial compressive stress is exerted on the stone between the pressure washers 26, the degree of compression of the stone can be increased or decreased by adjusting the elongation of the tendon to increase or decrease the tension in the tendon. The space in the bored hole 30 which is not occupied by the tendon 20 may optionally be filled with grout to protect the tendon from vibration and corrosion. However, in most instances, grout will not be used in the bore holes 30 since tendons in ungrouted holes have an advantage in that their tension can be adjusted for changes in load. The compression in the stone caused by the tendon and anchors may be altered in the manner noted previously to alter plate deflection and provide a more perfectly flat upper surface, or to allow the plate to support various heavier or lighter loads at different times.

Because natural stone has low tensile strength, the induced compression adds greatly to the stone's ability to resist bending, under the stress of a load placed on the upper surface 12 of the surface plate 10. The foregoing result is achieved as a consequence of the fact that tensile stress caused by such a load can be directly canceled by the compressive stress introduced by the inward pressure of the pressure washers.

Also, because naturally occurring micro-cracks in the stone are compressed by the action of the pressure washers, the modulus of elasticity of the stone is raised considerably. This increase in the modulus of elasticity allows the stone surface plate to have a higher first bending mode frequency than a non-compressed plate of the same cross-section. Since the equipment mounted on surface plates frequently generates lower frequencies than the first bending mode frequency achieved by use of the present invention, many resonant frequency vibrations previously encountered can be avoided by use of the subject invention.

It should be understood that while FIG. 1 illustrates only one bore 30 and its associated tendon 20, multiple bores and tendons could be provided such as, for example, along longitudinal axis B and transverse axes C and D. Tendons provided in transverse bores provided along axes C and D would be of particular value in correcting slab deflection (sag) between front and rear support pillars 36, especially when four pillars in rectangular array are used to support the surface plate.

Figure 3:
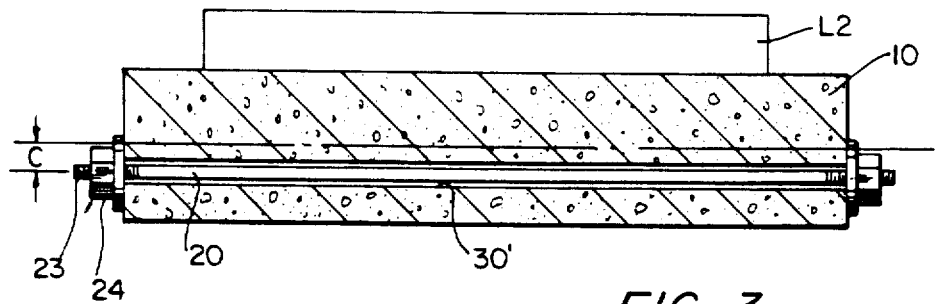
FIG. 3 is a section view similar to FIG. 2, but depicting an alternative mode of implementing the present invention, in which the tendon and fastener apparatus is offset downwardly from the center of the stone plate.

FIG. 3 illustrates a second embodiment of the invention embodiment in which an offset bore 30' and associated offset tendon 20 is positioned eccentric to the plate's center line by this eccentric value "e". This offset of the tendon compression causes a righting moment in the stone plate exceeding that of the first embodiment. The righting moment may be used to resist applied loads such as from equipment L2 of any desired type requiring a stable support on a planar surface; the arrangement permits the offset tendon to cancel deflection caused by dead or applied loads on upper surface 12. Plural offset bores and associated tendons could also be employed in this embodiment such as along axes corresponding to axes B, C and D of FIG. 1.

Figure 4:
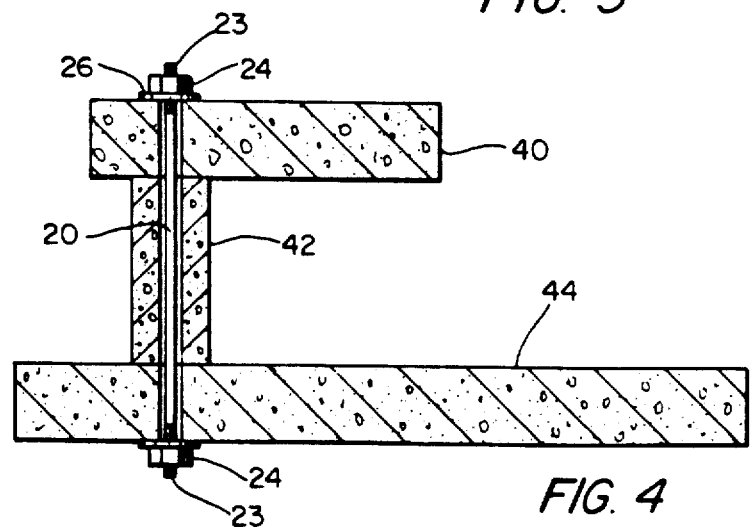
FIG. 4 is a section view depicting a second alternative mode of implementing the present invention.

FIG. 4 illustrates a further embodiment of the present invention comprising a structurally sound, geometrically complex assemblies of plural stone components, which would be difficult or impossible to provide from a single unitary stone member. More specifically, FIG. 4 illustrates such a complex multi-component assembly formed by three stone slab components 40, 42 and 44 which are held together by tendon 20, nuts 24 and pressure washers 26. The stone slab components are held together by tendon 20 with the forces exerted by the tendon acting on slabs 40 and 44 so as to place slab 42 under compression to permit it to carry a higher load than would otherwise be possible. Slabs 40 and 44 could also be compressed by longitudinal tendons if desired and additional vertical tendons could also be used. The inventive method and apparatus thus allow individual stones to be joined into a multitude of different shapes having an indefinite number of stone components and geometric configurations determined by the size and shape of the item with which the assembly will be used.

Similarly, the invention provides for deployment of tendons in two axes in order to induce compression in two-way slabs. Such deployment along two directions in the stone allows exploitation of the advantages described above, but in two dimensions.

Plural, substantially parallel tendons may also be used, each in their own bores. In this manner, more compressive stress may be imposed to accommodate various loads. Typically, up to approximately 100,000 pounds of tension could be imposed in each tendon, using solid rod type tendons which comprise 1.375-inch diameter high strength steel (ASTM A722). Although cost and performance favor ASTM A722, it is also possible in some instances to use tendons formed of steel wire strands made of other low relaxation steel, such as ASTM A416. Commercial threaded tendon assemblies such as both the solid rod and multistrand systems of Dywidag-type Systems can be used in practice of the various aspects of the invention.

It would also be possible to use threaded nuts on only one end of each tendon with a fixed flange or head cap being provided on the opposite end.

Of course, these are but exemplary products and methods which may be used to advantage in embodying the present invention. The invention itself is to be limited only in accordance with the appended claims.

It is generally desirable to employ tendons and tensions in which the first bending mode is suitable for the application at hand. For example, when using high precision machinery atop a stone plate, it is desirable to avoid vibration or resonance phenomena associated with the first bending mode frequency of the stone plate. Avoidance of these undesirable phenomena is possible, given knowledge of possible resonances which could be induced by the machinery as it operates. Because it is known that the bending mode frequency may be adjusted through increasing the modulus of elasticity (caused by closing of microcracks), such undesirable vibration and resonance phenomena may be avoided.

Just as tendons of different composition may be employed in practicing the present invention, stone plates other than Barre granite may benefit from the principles described herein. For example, some non-quartz bearing rock having a higher natural modulus of elasticity, can sustain higher stress and provide greater deflection control than Barre granite.

Thus, modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A method of increasing the strength of a first stone member for such applications as load bearing, the method comprising the steps of:
   (a) providing a first bore hole through the stone member, the bore hole extending through and between first and second outer surfaces of the stone member so as to define first and second openings respectively provided in said first and second outer surfaces;
   (b) providing a tendon extending along the length of the bore hole so that said tendon extends through the bore hole and protrudes at each end outwardly beyond one of said openings; and
   (c) causing force exerting means on one end of the tendon to react with the stone surface adjacent said one end to exert outward force on the tendon while restraining the other end of the tendon against movement to place the tendon in tension, and thereby cause compressional stress to the stone member in the area surrounding said bore hole so as to increase the resistance of the stone member to a load.

2. The method of claim 1 wherein said bore hole is provided in a position below the midpoint of the height dimension of said stone member.

3. The method of claim 2 wherein:
   said stone member is rectangular and has parallel upper and lower surfaces, parallel front and rear surfaces; and
   said first and second outer surfaces comprise parallel end surfaces.

4. The method of claim 2 including the additional steps of:
   (d) providing a second bore hole perpendicular to said first bore hole but not intersecting said first bore hole;
   (e) providing a second tendon in said second bore hole extending along the length thereof and protruding outwardly beyond the ends of said second bore hole; and
   (f) causing force exerting means on one end of said second tendon to react with a portion of the stone member adjacent said one end of said second tendon to exert outward force on the second tendon while restraining the other end of the second tendon against motion to effect tensioning of the second tendon so as to place the portion of the stone member surrounding said second bore hole in compression in a direction perpendicular to the compressional stress caused by tension in the first tendon.

5. The method of claim 4 wherein said stone member is rectangular and has parallel upper and lower surfaces, parallel front and rear surfaces, and said first and second outer surfaces comprise parallel end surfaces.

6. The method of claim 5 wherein said second bore hole has an axis positioned below and parallel to a plane extending through the midpoint between said upper and lower surfaces and including the further steps of:
(g) providing a third bore hole parallel to and horizontally aligned with said first bore hole, positioning a third tendon in said third bore hole and tensioning said third tendon in the manner of the tensioning of said first tendon to place the portion of the stone member surrounding said third tendon in compression; and
(h) providing a fourth bore hole parallel to said second bore hole, positioning a fourth tendon in said fourth bore hole and tensioning said fourth tendon in the manner that said second tendon is tensioned to place the portion of the stone member surrounding said fourth bore hole in compression.

7. The method of claim 5 including the additional steps of:
(g) placing a load on said upper surface; and
(h) adjusting the tendon tension to maintain said upper surface in substantially planar configuration.

8. The method of claim 1, wherein:
(A) after step (a) the method further comprises the steps of:
(a1) providing second and third stone members each having a bore extending therethrough;
(a2) positioning the second stone adjacent and in contact with the first outer surface with the bore in said second stone being axially aligned with said first bore;
(a3) positioning the third stone member adjacent and in contact with the second outer surface with the bore in the third stone member being axially aligned with said first bore; and
(B) step (c) includes:
(c1) positioning said ends of said tendon to extend outwardly beyond said second and third stone members so that the tensioning of said tension urges said second and third stone members toward each other so as to place said first stone member in compression.

9. The combination of a stone formed work support having an upper load supporting surface, a load supported on said load supporting surface, leg means engaging lower surface portions of said stone formed work support at spaced locations so that said stone formed work support includes an elevated span portion extending between said leg means and thereby tending to sag there between and force exerting means for compressing a portion of said span portion to reduce the amount of sag of said span portion to compensate for the weight of said load.

10. The combination of claim 9 wherein said stone formed work support comprises a rectangular surface plate having parallel vertical end surfaces and said load supporting surface is an upper horizontal surface.

11. The combination of claim 10 wherein said leg means includes front-to-rear spaced legs means between which front-to-rear slightly sagging space exists and said force exerting means includes lengthwise extending tendon means extending the length of a bore connecting said parallel end surfaces, reaction means respectively engageable with one of said parallel vertical end surfaces for tensioning said tendon means and compressing the stone in an area extending outwardly from said bore along the length of said bore.

12. The combination of claim 11 wherein said rectangular surface plate includes vertical parallel front and rear surfaces and said force exerting means includes front-to-rear extending tendon means extending the length of a front-to-rear extending bore connecting said front and rear surfaces, reaction means respectively provided on each end of said front-to-rear extending tendon means respectively engageable with one of said front and rear surfaces for tensioning said tendon means and compressing the stone in an area extending outwardly from said front-to-rear extending bore and along the length of said front-to-rear extending bore so as to reduce front-to-rear sag of said stone formed work support.

13. The combination of claim 12 wherein said tendons comprise steel rods having threaded ends and said reaction means comprise a threaded nut threadably mounted on each threaded end and engaged with a pressure washer positioned between said threaded nut and an adjacent stone surface.

14. An adjustable load support apparatus for bearing loads, the apparatus comprising:
a stone plate having a load support upper surface and a first bore hole having two end openings, each end opening respectively being provided in one of two parallel external end surfaces of the stone plate;
a longitudinal tendon extending along the length of said bore hole; and
force applying means on the ends of said tendon, operable for engaging the end surface of the stone plate adjacent each end of the bore hole for adjustably tensioning the tendon and placing a portion of the stone plate between the force applying means in compression so as to compress the stone plate to a degree that micro-cracks therein are substantially closed and the modulus of elasticity of the stone plate is increased.

15. The apparatus of claim 14 wherein said tendon does not contact the surface of said bore hole and a clearance space is provided between the tendon and the surface of the bore hole to permit relative movement between the tendon and the surface of the bore hole.

16. The apparatus of claim 14 additionally including a second longitudinal tendon spaced parallel to and rearwardly of said first longitudinal tendon extending along the length of a second bore hole extending parallel to said first bore hole and having end openings in said end surfaces, second force applying means on the ends of said second tendon and engaged with the end surface of the stone plate adjacent each end of the second bore hole for tensioning the second tendon and placing a portion of the stone between said second force applying means in compression to increase the modulus of elasticity of the stone plate.

17. The apparatus of claim 15 wherein said stone plate additionally includes parallel front and rear surfaces, third and fourth parallel front-to-rear extending tendons respectively extending along the length of third and fourth bore holes extending perpendicular to said first bore hole and having end openings in said front and rear surfaces, front and rear force applying means respectively provided on the ends of said third and fourth tendons and respectively engaged with the end surface of the stone plate adjacent each end of one of the third and fourth bore holes for tensioning the third and fourth tendons and placing portions of the stone plate adjacent the third and fourth bore holes and between said front and rear force applying means in compression to increase the modulus of elasticity of the stone.

18. A method of reducing low frequency resonant vibration of a stone formed work support for supporting equipment which generates machine generated vibrations at a given low frequency, said method comprising increasing the resonant frequency of the stone formed work support by placing a first portion of the stone in compression to increase the resonant frequency of the stone to a value substantially exceeding the frequency of said machine generated vibrations.

19. The method of claim 18 wherein said stone portion is placed in compression by tensioning tendon means extending through said stone formed work support and applying the force generated by the tendon tension to force applying members engaging opposite sides of said stone formed work support.

20. The method of claim 18 additionally including the step of placing a second portion of said stone in compression simultaneously with said first portion.

21. The method of claim 18 wherein said stone portion is placed in compression by tensioning tendon means extending through said stone formed work support and applying the force generated by the tendon tension to force applying members engaging opposite sides of said stone formed work support.

* * * * *